(12) United States Patent
Snow et al.

(10) Patent No.: US 6,186,808 B1
(45) Date of Patent: Feb. 13, 2001

(54) HIGH DENSITY HIGH PERFORMANCE TELECOMMUNICATIONS/DATA LINK AND CONNECTOR WITH TAP AND CONTACT DISPLACEMENT ASSEMBLY

(75) Inventors: Richard Herbert Snow, Deer Trail; Timothy James Pickles, Aurora, both of CO (US); Ross S. Johnson, Hudsonville, MI (US)

(73) Assignees: Krone GmbH (DE); Haworth, Inc., Holland, MI (US)

( * ) Notice: Under 35 U.S.C. 154(b), the term of this patent shall be extended for 0 days.

(21) Appl. No.: 09/067,508

(22) Filed: Apr. 27, 1998

(51) Int. Cl.$^7$ .................................................. H01R 13/02

(52) U.S. Cl. .......................................... 439/225; 439/189

(58) Field of Search .................................... 439/225, 189, 439/215, 289, 295, 284

(56) References Cited

U.S. PATENT DOCUMENTS

| | | | |
|---|---|---|---|
| 3,234,464 | * 2/1966 | Neon et al. | 439/225 |
| 4,227,764 | 10/1980 | Fiske . | |
| 4,748,541 | 5/1988 | Nozick . | |
| 4,781,609 | 11/1988 | Wilson et al. . | |
| 4,872,843 | * 10/1989 | Anstey et al. | 439/69 |
| 5,160,276 | 11/1992 | Marsh et al. . | |
| 5,236,370 | 8/1993 | King et al. . | |
| 5,272,277 | 12/1993 | Humbles et al. . | |
| 5,460,545 | 10/1995 | Siemon et al. . | |
| 5,593,317 | 1/1997 | Humbles . | |
| 5,634,817 | 6/1997 | Siemon et al. . | |
| 5,719,933 | 2/1998 | Welch . | |
| 5,816,836 | * 10/1998 | Snow et al. | 439/225 |
| 5,938,462 | 8/1999 | Wilson et al. . | |
| 5,957,714 | 9/1999 | Johnson et al. . | |
| 5,964,609 | 10/1999 | Wilson et al. . | |

FOREIGN PATENT DOCUMENTS

WO 96/23339  8/1996  (WO) .
WO 96/23340  8/1996  (WO) .

* cited by examiner

Primary Examiner—Lincoln Donovan
Assistant Examiner—J. F. Duverne
(74) Attorney, Agent, or Firm—McGlew and Tuttle, P.C.

(57) ABSTRACT

A telecommunications/data link and connector assembly is provided including a transmission cable comprising a plurality of transmission lines, a first interface end assembly and a second interface end assembly. The first interface end assembly comprises a first contact alignment body including a line connection end and an opposite end. A first end plurality of contact elements is provided with each of the contact elements being positioned and aligned by the first contact alignment body and extending from adjacent to the line connection end toward the opposite end. Each of the first side contact elements is movable between a contact position and a non-contact position. Each of the first side contact elements includes a contact area and a line connection area for an electrical connection with a line. A first end shield housing is provided wherein the first contact alignment body is disposed in the first end shield housing in a locked position. The contact alignment body may be removed from the first shield upon unlocking. The second interface end assembly has a second contact alignment body including a line connection end and an opposite end. A second end plurality of contact elements is provided with each of the contact elements being positioned and aligned by the second contact alignment body and extending from adjacent to the line connection end toward the opposite end. Each of the second side contact elements is movable between a contact position and a non-contact position, each of the second side contact elements including a contact area and a line connection area for an electrical connection with a line. A second end shield housing is provided wherein the second contact alignment body is disposed in the second end shield housing in a locked position.

19 Claims, 18 Drawing Sheets

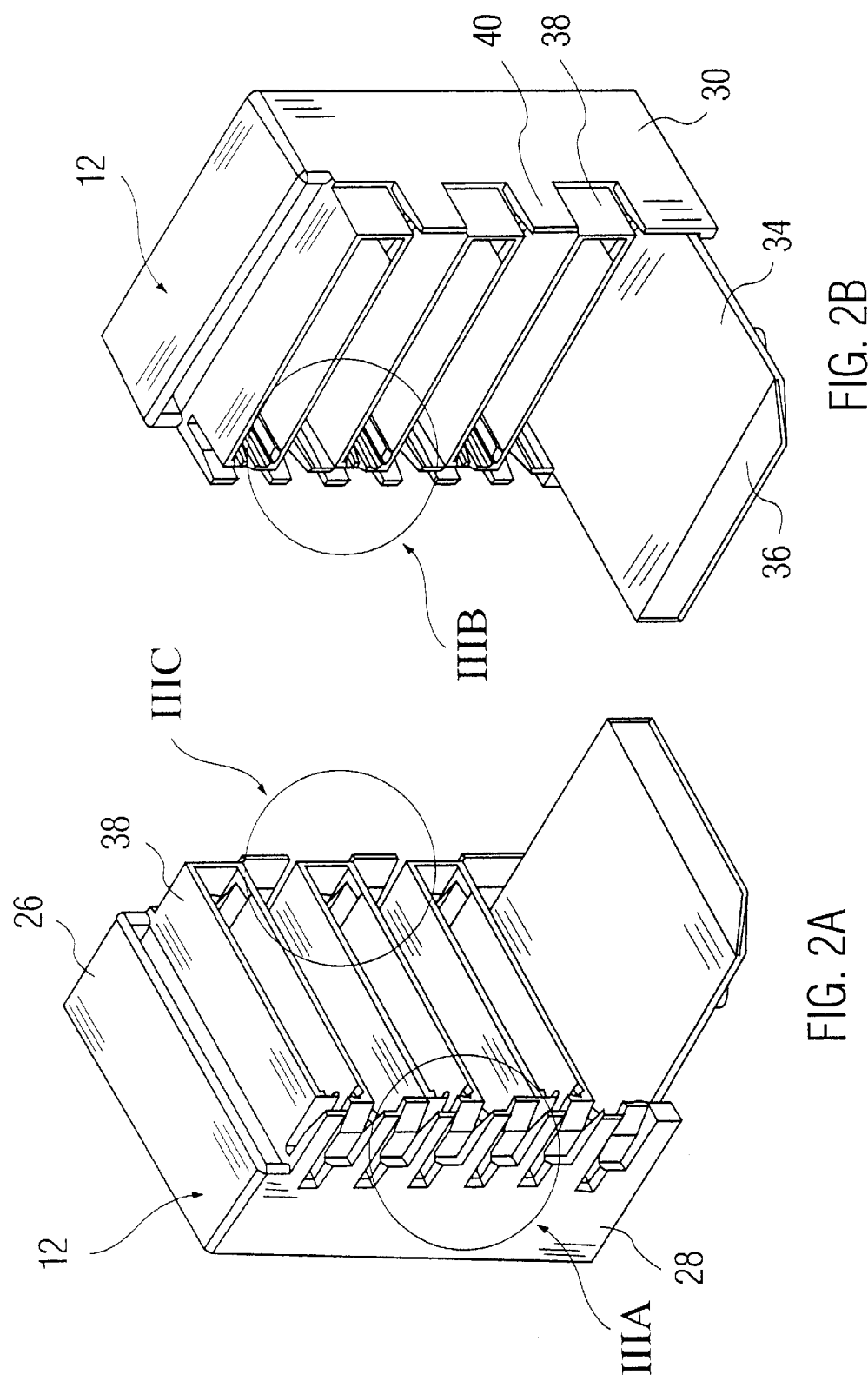

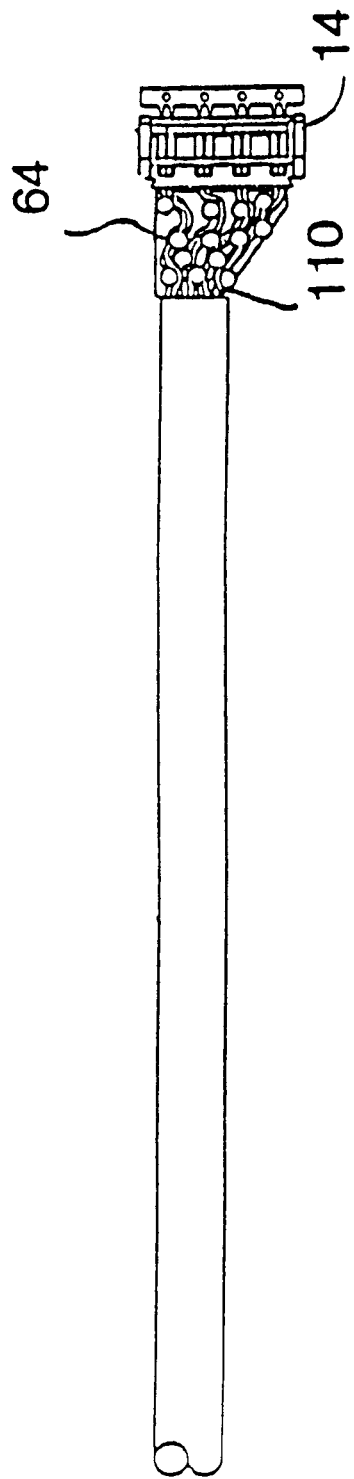

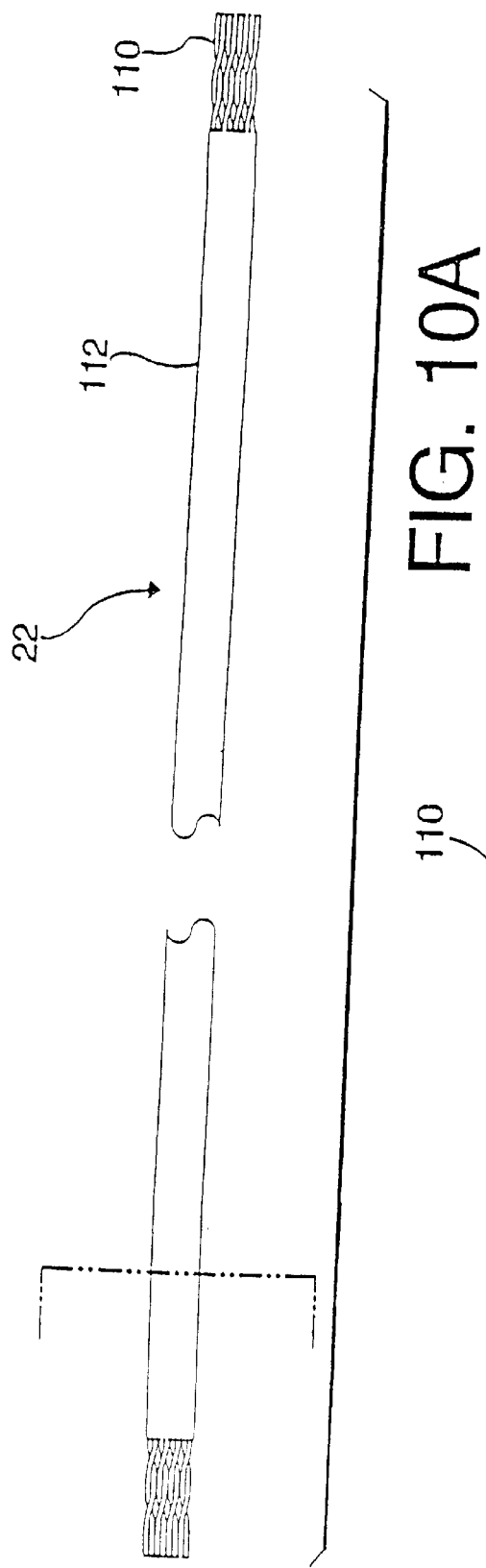
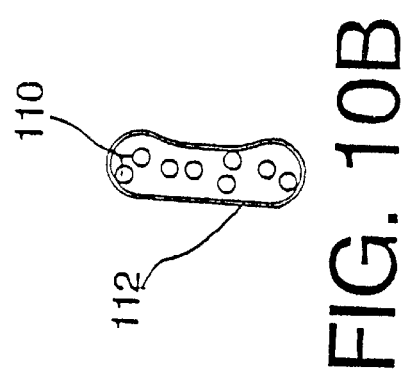
FIG. 10A
FIG. 10B

Fig. 14
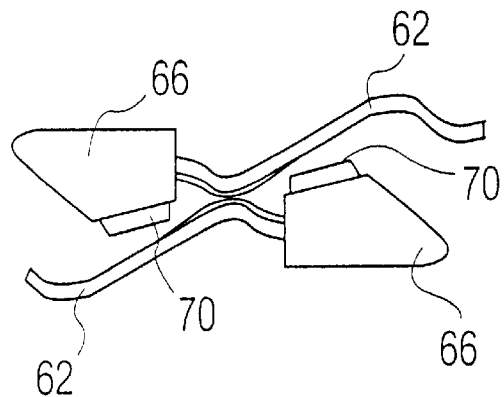
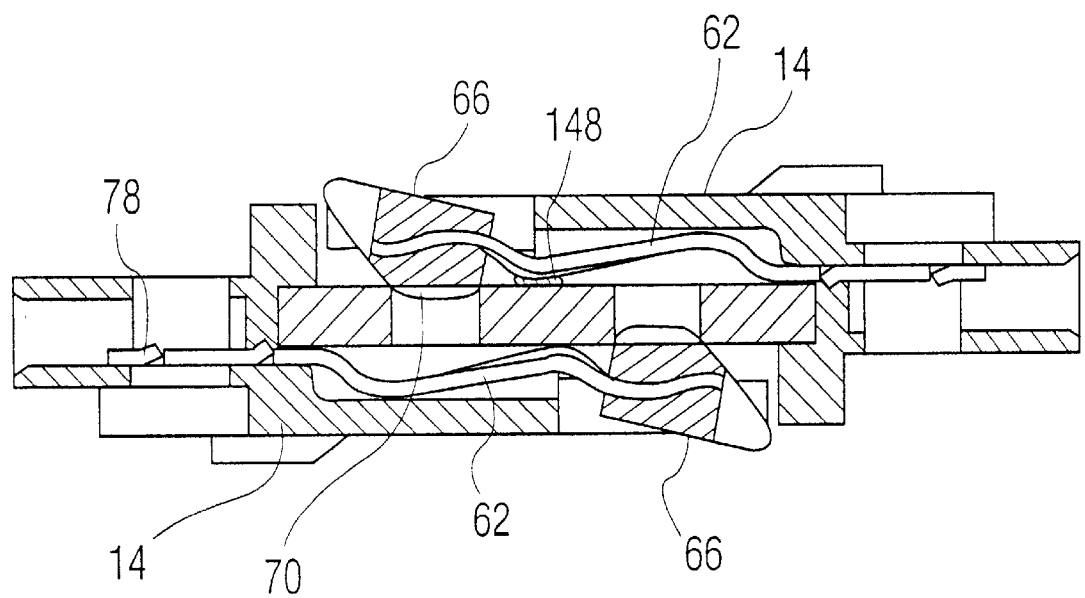
FIG. 15

HIGH DENSITY HIGH PERFORMANCE TELECOMMUNICATIONS/DATA LINK AND CONNECTOR WITH TAP AND CONTACT DISPLACEMENT ASSEMBLY

FIELD OF THE INVENTION

The present invention relates to telephone systems and local area network systems and more particularly, to an improved high density connector assembly for use within buildings for supplying a plurality of work areas with a selection of voice and data transmission links.

BACKGROUND OF THE INVENTION

Commercial space is often provided as open floor areas. These are often divided into work areas (cubicals). The occupant of the commercial space typically determines the most efficient use of the floor space for its own needs and selects how the floor space is to be divided into smaller working areas through the use of portable wall panels and similar structures. So called "systems" furniture is used for dividing large floor spaces into smaller work areas (cubicals).

Systems furniture arrangements typically utilize interior upright space-dividing panels which connect together, serially, through two panel straight or angled connections, or through suitable three- or four-panel connections to define a large plurality of individual work areas. Such panels are typically less than floor-to-ceiling height and cooperate with other furniture components to define an equipped work area.

Each work area must be supplied with adequate electrical power and communication cabling. Various systems and components have been developed including modular electrical systems which cooperate with and which readily mount on the panels. This allows the panels to be reconfigured and allows the supply of power to the work areas.

Systems have been proposed to avoid the use of a large number of conventional four pair communication cables fed through floor conduits or ceiling clearance spaces to the various work areas. Examples of such prior art attempts include the systems and devices disclosed in U.S. Pat. Nos. 5,272,277; 5,160,276 and 4,928,303.

Numerous systems have been proposed relating to power lines and systems furniture. Many of these systems include features which solve particular problems relating to power transmission and distribution with systems furniture.

U.S. Pat. No. 4,781,609 discloses a multicircuit electrical system which is used with wall panels. The electrical system is a seven conductor system employing three live and three neutral conductors for defining three separate electrical circuits each having a separate neutral. A portable power tap unit (a receptacle unit) can be plugged into the power block for selective engagement with any one of the three circuits. Although this system provides great advantages with regard to power and selecting one of the various circuits at the location, after the wall panels are put into place, using the tap feature, the system involves a great many components and is particular to the power distribution problem.

U.S. Pat. No. 5,236,370 discloses another electrical system for use with interior space dividing walls. The system is prefabricated and includes elongate harnesses mounted within channels which extend interiorly of the space-dividing members. Adjacent harnesses are electrically joined by flexible electrical jumpers which create plug like connections with power blocks. This system provides significant advantages as to ease of use. However, the system again includes numerous components which adds significant expense. Additionally, the system again includes features which are directed toward power distribution and problems associated with power distribution.

SUMMARY AND OBJECTS OF THE INVENTION

It is an object of the invention to provide a high density high performance transmission and connector system for telecommunications and data applications, wherein the connector provides a good physical and electrical connection such that transmission portions can be linked while maintaining high signal quality, even for high frequency applications and which system allows for a simple tapping of signals at the connector.

According to the invention, a telecommunications/data link and connector assembly is provided including a transmission cable comprising a plurality of transmission lines, a first interface end assembly and a second interface end assembly. The first interface end assembly comprises a first contact alignment body including a line connection end and an interface end. A first end plurality of contact elements is provided with each of the contact elements positioned and aligned by the first contact alignment body and extending from adjacent to the line connection end toward the interface end. Each of the first side contact elements is movable between a contact position and a non-contact position. Each of the first side contact elements includes a contact area and a line connection area for an electrical connection with a line. A first end shield housing is provided wherein the first contact alignment body is disposed in the first end shield housing in a locked position. The second interface end assembly has a second contact alignment body including a line connection end and an interface end. A second end plurality of contact elements is provided with each of the contact elements being positioned and aligned by the second contact alignment body and extending from adjacent to the line connection end toward the interface end. Each of the second side contact elements is movable between a contact position and a non-contact position, each of the second side contact elements including a contact area and a line connection area for an electrical connection with a line. A second end shield housing is provided wherein the second contact alignment body is disposed in the second end shield housing in a locked position. Each of the first end shield and the second end shield is substantially identical and matable. These end shields are also matable with a first end shield and a second end shield of a substantially identical telecommunications/data link and connector assembly. Contact elements carried by each the contact alignment body are in a contact position when an associated end shield is in a mated position. A tap is provided which is insertable between contact elements for tapping signals carried by the contact elements.

The tap includes a tap transmission line and connected contact portions. The tap contact portions make electrical contact with one of a first side plurality of contacts and a second side plurality of contacts elements.

A contact displacement means is provided for moving contacts between the contact position and the non-contact position allowing insertion of the tap between the first side plurality of contact elements and the second side plurality of contact elements. The contact displacement means includes a first contact opening device connected to the first side plurality of contact elements. The first contact opening device is engaged by the tap means for moving contacts between the contact position and the non-contact position allowing insertion of the tap between the first side plurality of contacts and the second side plurality of contacts. The contact displacement means preferably also includes a second contact opening device connected to the second side plurality of contacts and a tip of the tap means. The first contact opening device and the second contact opening device are for moving contacts between the contact position and the non-contact position.

The invention also includes a process of forming a telecommunications/data link and connector assembly including providing a contact alignment body with grooves for contacts and spaces for receiving wire side contact ends. The contacts are positioned in the grooves with wire contact ends extending into a wire and wire side contact end receiving spaces. A contact displacement member is provided connected to ends of the contacts at the interface end. A wire guide with a plurality of wire channels is also provided. The wire guide has a cable end with a small width and a contact alignment body end with a larger width. The wire guide channels each have a wire path of substantially identical length, extending from the cable side to the contact alignment body side. A cable with wire terminal ends is employed. These wire terminal ends are positioned in the guide channels of the wire guide and a contact portion of the terminal ends extends out of the guide channels. The contact portions are electrically connected with corresponding contacts at wire side ends of the contacts. The cable, the wire guide and the contact displacement assembly are joined by applying an overlay molded housing. The overlay housing is applied by positioning a portion of the cable, the wire guide and a portion of the contact displacement assembly in a mold and injecting material in the mold to form the overlay molded housing. The connected elements with the overlay molded housing forms a single contact displacement assembly.

The wire contact ends and the contact wire side ends are preferably electrically connected by ultrasonic bonding (or ultrasonic welding). The contact alignment body preferably includes mold housing receiving sockets for receiving material of the overlay molded housing therein. The overlay molded housing preferably defines support rails.

A plurality of the single contact displacement assemblies are provided. These are inserted into a shield element forming a plurality of spaces. The shield element also includes a plurality of alignment portions corresponding to each of the spaces. Two substantially identical shield elements may be mated by connecting the alignment portions. The alignment portions (alignment tabs) are preferably male and female in an alternating arrangement, whereby two shields of substantially identical form are mated by engaging the alignment portions while the shields are facing and one is rotated 180° with respect to the other.

The shields are preferably formed of a plastic with embedded metallic elements. The metallic elements may be for example stainless steel. This provides an important shielding function (shielding one mated contact set from adjacent mated contacts). This advantageously affects the performance of the connector interface ends when they are mated with a substantially identical interface end.

After inserting a contact alignment body of each single contact displacement assembly into each space of the shield, the contact alignment bodies are locked into place. When the shields are mated, the contacts are engaged for passing electrical signals.

An indicator label element for a first side of the shield is provided and another indicator label element is provided for another side of the shield. Each indicator label element includes receiving grooves for receiving a plurality of the support rails to cooperate with the single contact displacement assemblies and the shield to form a connector block.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2A is a left top perspective view of a shield element of the contact displacement assembly of FIG. 1;

FIG. 2B is a right top perspective view of the shield element of FIG. 2A;

FIG. 7B is a top view of a cable with twisted pair wires passing through a wire guide and connecting to contacts of the contact alignment body of an interface end;

FIG. 10A is a cutaway view showing a portion of the cable and twisted pair terminal ends;

FIG. 10B is a cross-sectional view of the cable;

FIG. 14 is a partial side cutaway view illustrating contact between contacts of mated interfaces; and FIG. 15 is a side sectional view showing a mated interface with an inserted tap wherein a line is tapped and a downstream line is disconnected.

DESCRIPTION OF THE PREFERRED EMBODIMENT

Figure 1:
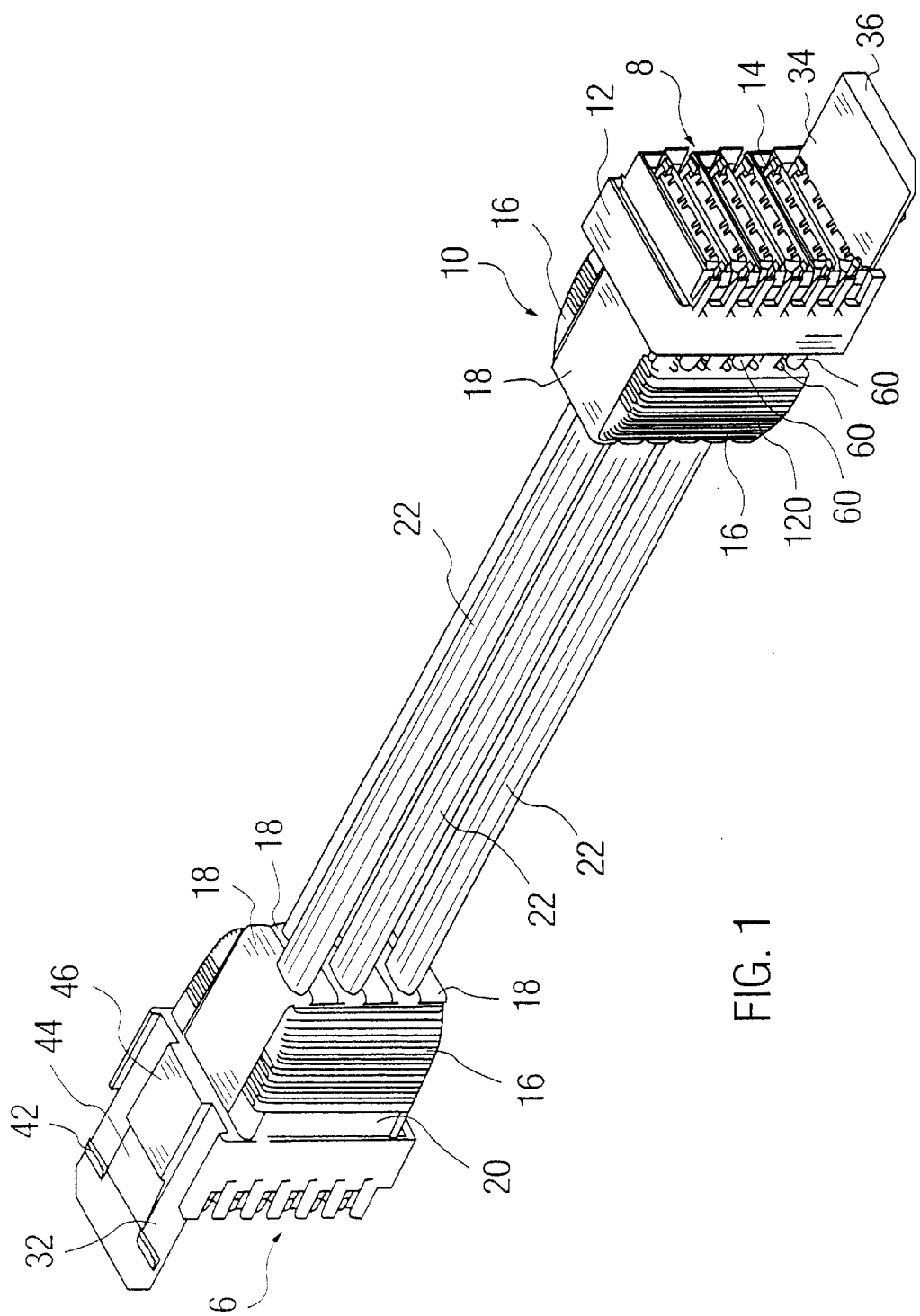
FIG. 1 is a perspective view showing a six circuit contact displacement assembly including two interface ends.

Referring to the drawings in particular, the invention comprises a multi-circuit contact displacement assembly (CDA) generally designated 10. The assembly includes a fist interface end assembly 6 and an identical (substantially identical, apart from minor tolerance variations) second interface end assembly 8. Although the interface ends 6 and 8 are identical, they have male and female portions (alignment tabs) whereby they are adapted to be positioned in a mated contact state. Each interface end 6, 8 is intended to be used for mating connection with another multi-circuit CDA to provide a linking of transmission lines at the contact interfaces and to provide a tapping region for tapping the lines. The multi-circuit contact displacement assembly 10 is particularly useful when disposed in modular office furniture components such as modular walls used to make office cubicals. A plurality of contact circuit assemblies may be provided in parallel (such as three) for eighteen different single contact displacement assemblies in parallel providing a multiplicity of two pair lines.

FIG. 1 shows a six circuit CDA 10 with each interface end (6, 8) having a shield 12 supporting a plurality of contact alignment bodies 14. As discussed further below, the contact alignment bodies 14 may be snapped into shield 12 where they are retained for providing one connection side at a contact interface. The contact alignment bodies 14 are part of single contact displacement alignment (CDA) assemblies 18. In the position as shown in FIG. 1, with the single CDAs 18 supported by shield 12, color indicator label element 16 may be connected to the single CDA assemblies 18. Additionally, a circuit indicator element 20 may be connected to the single CDA assemblies 18 on a non-tap insertion side of each interface. On a tap side of the interface, the single CDA assemblies 18 are exposed.

FIG. 2A shows a left top perspective view of a housing, particularly a shield housing 12. The shield housing 12 is preferably a unitary molded structure. The shield housing 12 is preferably formed of a plastic with embedded stainless steel fibers or stainless steel elements to provide an electrical shield function. The shield 12 has an upper surface 26, a tap access side 28, a non-access side 30 as well as a bottom 32 (see FIG. 1). The bottom 32 includes a tongue 34 which provides an engagement function for connection of two interface ends. The tongue includes a tongue bezel 36. To provide for engagement, each shield includes a male enclosure portion 38 and a female enclosure portion 40 (these are also referred to as alignment tabs). These two enclosure portions mate for connection of two interface ends. The tongue bezel 36 provides for ease of insertion of the tongue 34 between an upper surface of male enclosure portion 38 and an interior surface of upper portion 26. On the underside or bottom side 32, the tongue includes an engagement bezel 42 with a locking rear edge. This allows a locking of one interface side by engagement of the engagement bezel 42 with the back edge of upper portion 26 as shown in phantom line in FIG. 4. The ramp 44 assists in locking the assemblies by providing a friction surface. The stop portion 46 provides a stop function upon contact of the front edge of stop portion 46 with a front edge of the shield upper part 26. Interface sides of single CDA assemblies 18 are connected to each other via single CDA assembly cable 22.

Figure 3C:
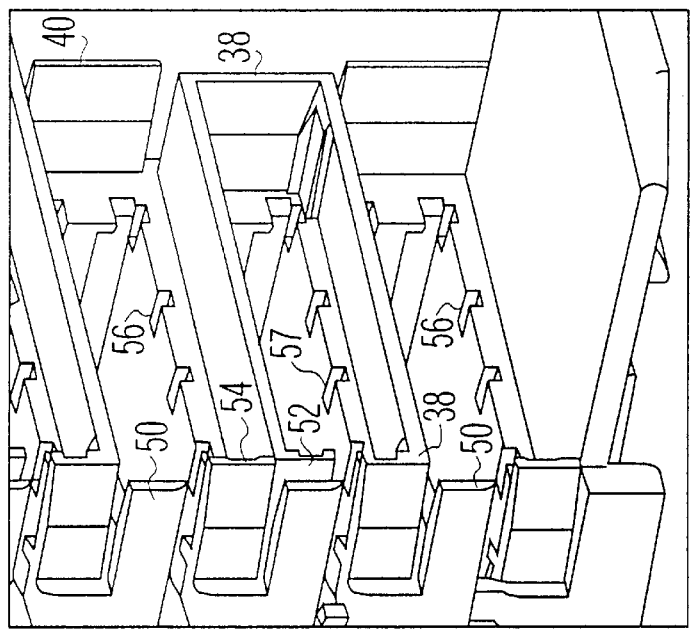
FIG. 3C is an enlarged view of the detail C of FIG. 2A.
Figure 3B:
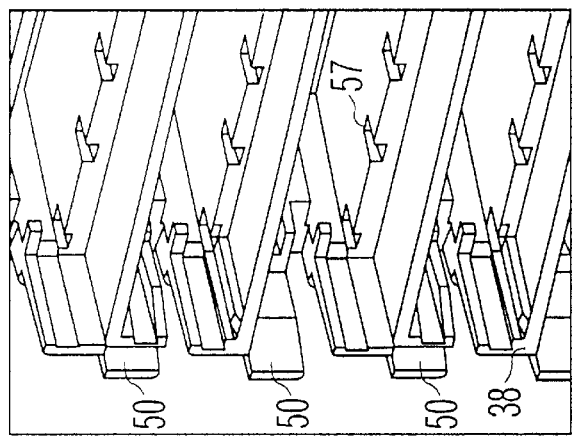
FIG. 3B is an enlarged view of the detail B of FIG. 2B.
Figure 3A:
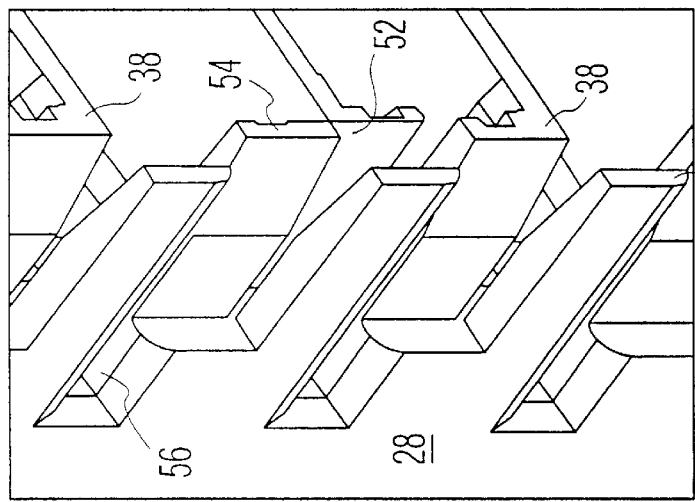
FIG. 3A is an enlarged view of the detail A of FIG. 2A.

FIGS. 3A, 3B and 3C provide enlarged views of the shield 12. As seen in FIG. 3A, at the access side 28 tap entry portion 50 delimits an upper edge of one side of a tap slot 56 which will be defined by mated interface ends. At the tap side 28, the male enclosure portion 38 includes a female recess 52 and a male portion 54. Male portion 54 is tapered to allow ease of connection of the two parts for mating contact. As can be seen from FIG. 3B, just behind each enclosure portion (both male enclosure portion 38 and female enclosure portion 40), the shield 12 has locking slots 57. These slots 57 are used for fixing the single CDA assemblies 18 to the shield 12. The shield 12 is shown in a position oriented for mating with another shield 12 in FIG. 4.

Figure 6:
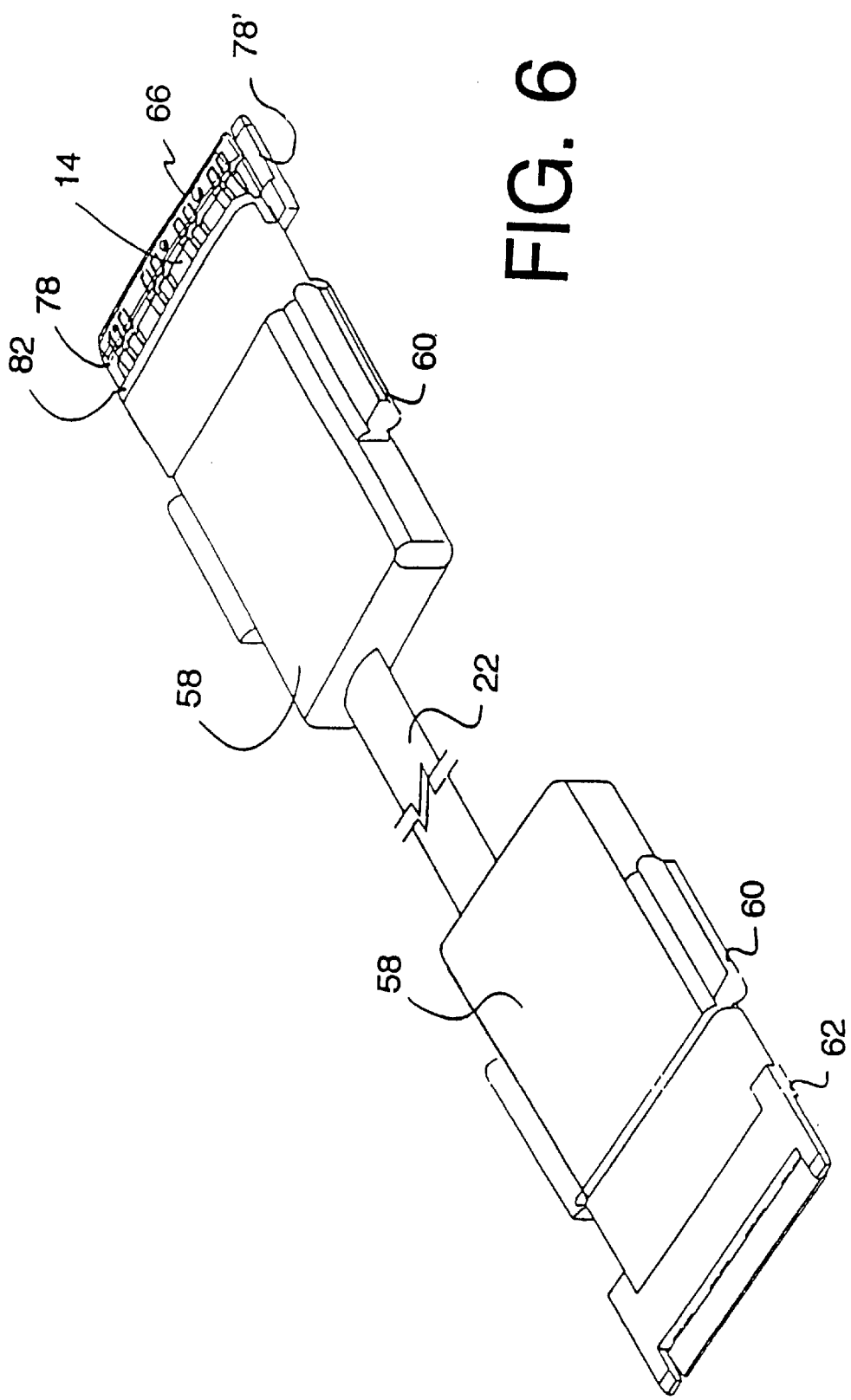
FIG. 6 is a perspective view of interface ends of a single contact displacement assembly (CDA), a component of the six circuit CDA of FIG. 1.

FIG. 6 shows a single contact assembly 18 including a single interface element end and portions of the associated cable 22. Each interface end of the assembly 18 includes an overlay molded housing 58. This overlay molded housing 58 has a function of joining the various components of each interface end of assembly 18. The overlay molded housing 58 includes support rails 60. These are discussed further below. Each assembly 18 also includes a contact alignment body 14 with contacts 62 and contact opening device 66. Each interface end of the assembly 18 also includes a wire guide 64 (see FIGS. 7A, 7B and FIG. 8).

Figure 7A:
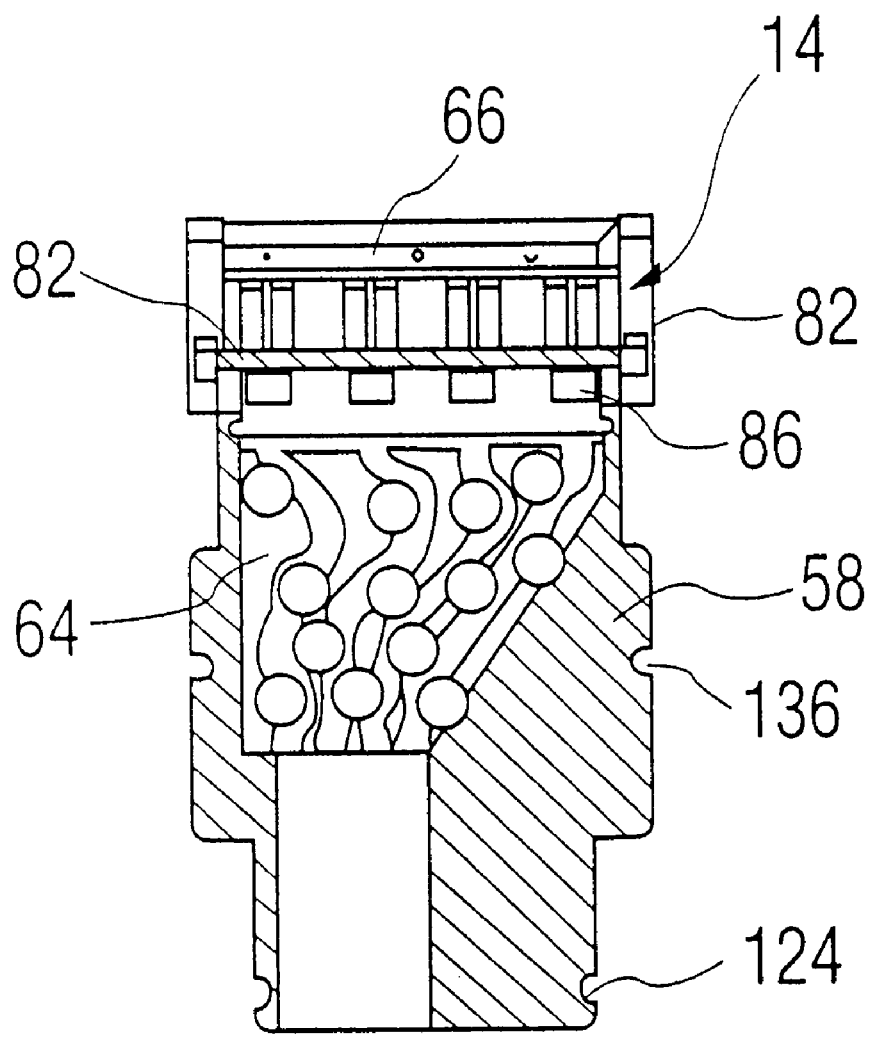
FIG. 7A is a cross-sectional view of an interface end of the single CDA assembly of FIG. 4.

FIG. 7A shows a cross-sectional view of an interface end of assembly 18, taken just above the contact surface. It can be seen that the overlay molded housing 58 extends into a region of the contact alignment body 14 to connect overlay molded housing 58 and alignment body 14. In joining with the body 40, overlay molded housing 58 also houses and surrounds wire guide 64. Overlay molded housing 58 also extends into the channels 88 which are provided for twisted pair terminal ends 110. This is discussed further below.

FIG. 7B shows a cable 22 with twisted pair terminal ends 110 extending into wire guide 64. The twisted pair terminal ends 110 also extend into contact alignment bodies 14 where they are connected (and make contact) with contact 62. The structure shown in FIG. 7B is the single CDA assembly 18 just prior to the application of the overlay molded housing 58.

Figure 8:
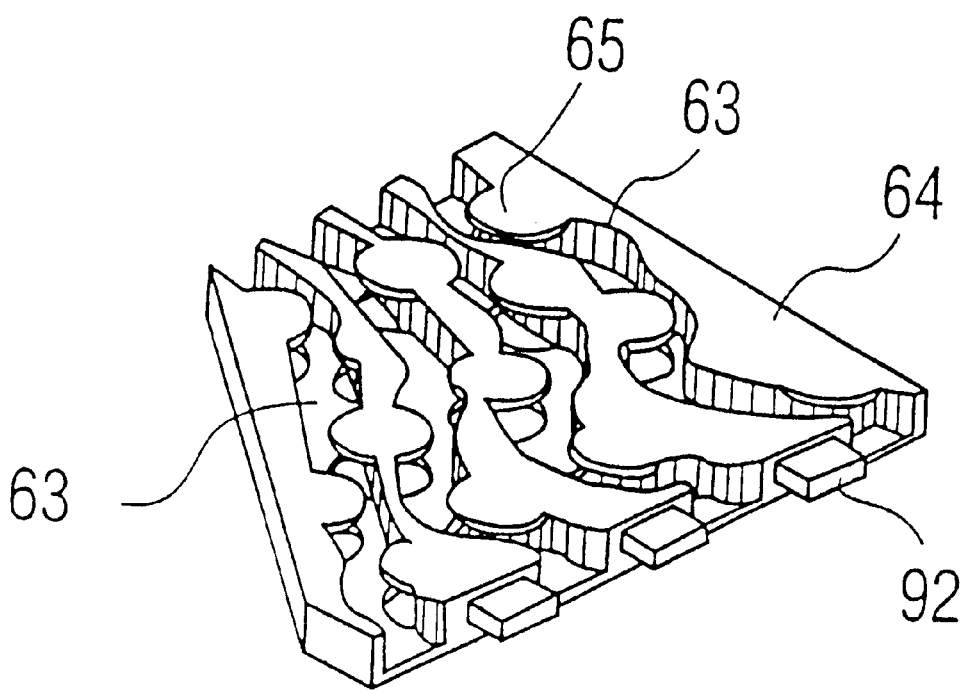
FIG. 8 is a perspective view of the wire guide.

FIG. 8 shows the wire guide 64 with a variety of channels 63. These channels 63 are significant as they provide twisted pair channels which are of substantially identical length (from one end to an opposite end). In this way, twisted pair wires 110, as shown in FIG. 10 can be used which have terminating ends which are of substantially the same length for each twisted pair 110. This provides a significant advantage as to manufacturing. Wire guide body 64 includes alignment protuberances 92 which facilitate alignment of the wire guide body 64 and the contact alignment body 14 during manufacture. Wire guide body 64 also includes overhang portions 64 which help retain the twisted pair within the channels 63 of wire guide body 64.

Figure 9A:
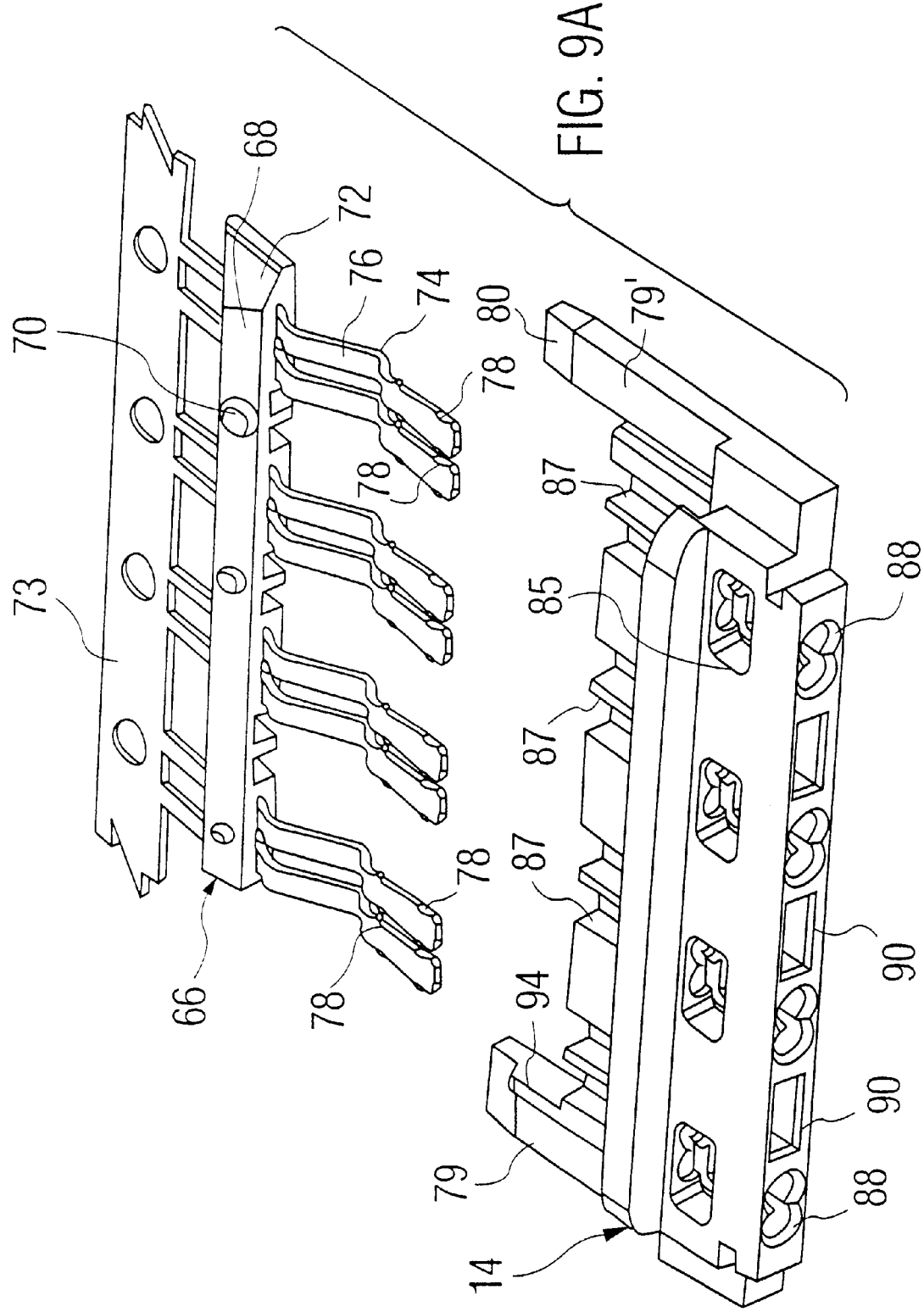
FIG. 9A is a perspective view of the contact alignment body with contacts attached to a lead frame and connected contact displacement device being inserted therein, prior to connection with the wires and wire guide.
Figure 9B:
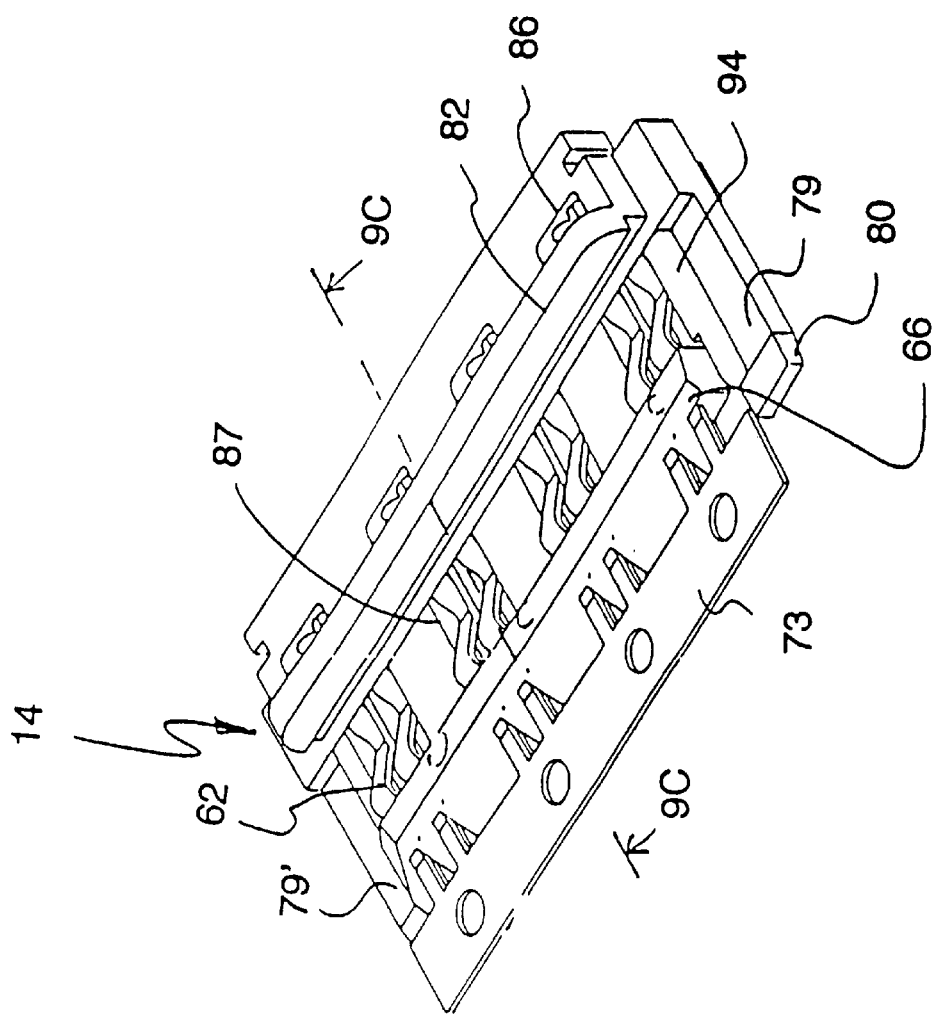
FIG. 9B is a perspective view of the contact alignment body with contacts attached to a lead frame inserted therein, prior to connection with the wires and wire guide.

FIG. 9B shows the contact alignment body 14 with associated contact elements 62 still connected to a lead frame 73 (the lead frame is subsequently removed) and contact displacement device (or contact displacement device) 66. As can be seen in FIG. 9A, the contact opening device 66 has a tap cam follower 68 with locking protuberances (or posts) 70 for locking in the contact position. The cam follower 68 includes bezel ramp 72 which allows insertion of the tap 138 and begins movement of the contact opening device 66 for moving contact portion 76 out of engagement as a tap 138 is inserted between contacts of mated interfaces. Each contact element 62 includes a spring portion with bend 74 and barbs 78.

Figure 9C:
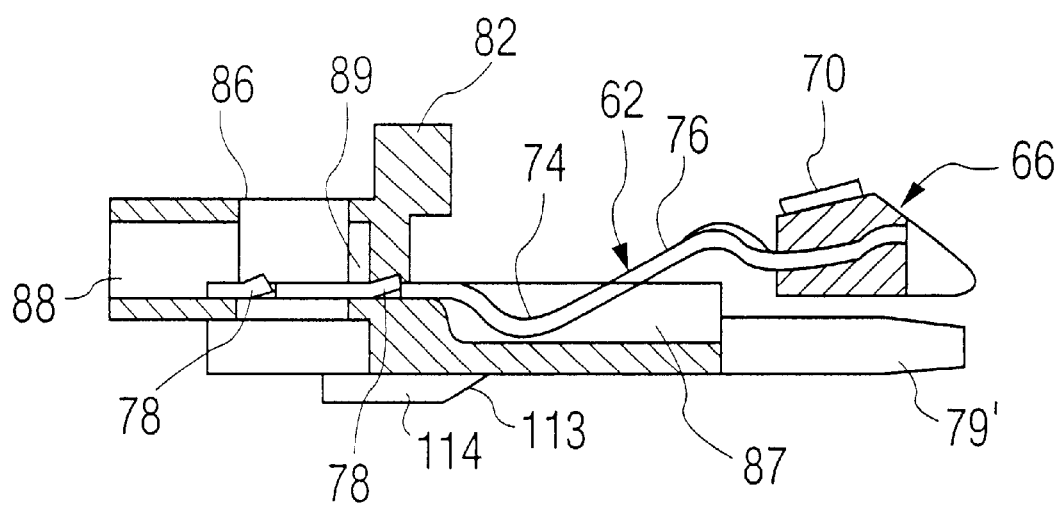
FIG. 9C is a cross sectional view showing the contact alignment body prior to insertion of the contacts.
Figure 9D:
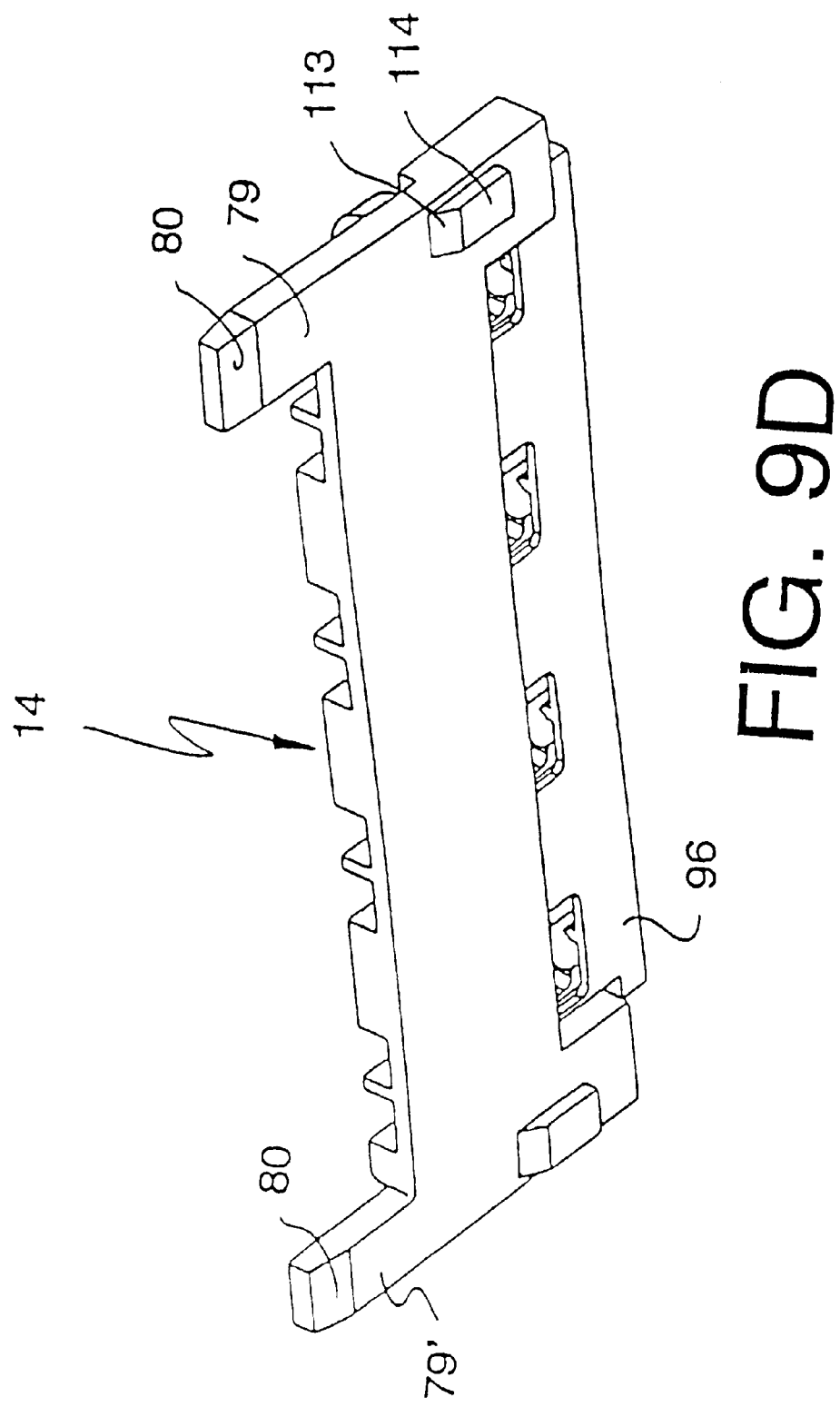
FIG. 9D is a bottom front perspective view showing the contact alignment body before being associated with the contacts and contact displacement device.

As can be seen in FIGS. 9A and 9D, each contact alignment body 14 has a front end with a receiving region 79 and a similar tap side receiving region 79'. These have at their very front edge a engagement bezel 80. As can be seen from FIGS. 9A and 9D, each bezel 80 is on an upper and lower side of each alignment body 14. At an upper side of each contact alignment body 14 there is provided a stop edge element 82. At the back side of contact alignment body 14 there are wire openings 88 as well as alignment slots 90 (see FIG. 9A).

FIG. 9D shows the underside of the contact alignment body 14. This includes a molded housing receiving space 96. By viewing FIGS. 9D and 9A, it can be appreciated that the overlap molded housing 58 extends up to the rear side of stop edge 82, extends into molded housing receiving sockets 86 and into molded housing receiving space 96, thereby unifying the contact alignment body 14, the wire guide 64 and the electrically connected contacts and twisted pair terminal ends. This assembly technique has the further advantage that the overlay molded housing 58 (see FIGS. 6, 7A and 7B), surrounds the cable jacket 112, surrounds the twisted pair terminal ends 110 and extends into the terminal end panels of wire guide 64. Overlay molded housing 58 also surrounds a rear portion of contact alignment body 14 and extends into the molded housing receiving sockets 86, surrounds the wire contact interface engages the contact barbs 78 and also fills the molded housing receiving space 96. This results in, among other things, a joining of the cable jacket 112 and the contact alignment body 14 such that there is no strain of the individual twisted pair terminating ends 110 and there is no strain at the contact interface between twisted pair terminating ends 110 and contact elements 62.

An alternative embodiment of the invention may also be provided wherein no wire guide 64 is provided. In this case the pair of terminating ends 110 are welded or otherwise electrically connected and affixed to contact elements 62 and the overlay molded housing 58 is applied. The overlay molded housing 58 provides isolation of the twisted pairs 110. The alignment slots 90 are not required.

FIG. 9C shows a cross-sectional view of the contact alignment body 14. In this view the receiving region 79' is shown along with the engagement bezel 80. Further, an alignment region 87 is shown which includes walls and a base support for positioning a contact element 62. Underneath and behind the stop 82 there is provided a space 89 which communicates with the mold housing receiving socket 86 and also communicates with the wire openings 88. This space 89 receives the wire side end of contact element 62. Although space 89 communicates with opening 86 and wire opening 88, the upper side regions of space 89 are delimited by the plastic (or other suitable material) walls of contact alignment body 14 such that upon insertion of the wire ends of contact elements 62 into space 89, the barbs 78 engage the contact alignment body housing 14. The contact element 62 cannot be effectively or easily removed from the contact alignment body 14, once they are inserted into the space 89, as the barbs 78 will dig into the plastic contact alignment body housing 14 above space 89, upon a pulling of the contact element 62 in a removal direction. Specifically, the barbs 78 are angled such that insertion of the wire end into the space 89 is fairly smooth but any retraction of the contact element 62 is effectively prevented as the barbs 78 engage the material of the alignment body 14 delimiting parts of space 89.

FIGS. 10a and 10b show aspects of the cable 22 for single CDA assembly 18. The cable 72 includes the cable jacket 112 and the twisted pair terminating ends 110. FIG. 10b shows the relative position of the various twisted pairs 110 and the jacket 112.

Figure 11:
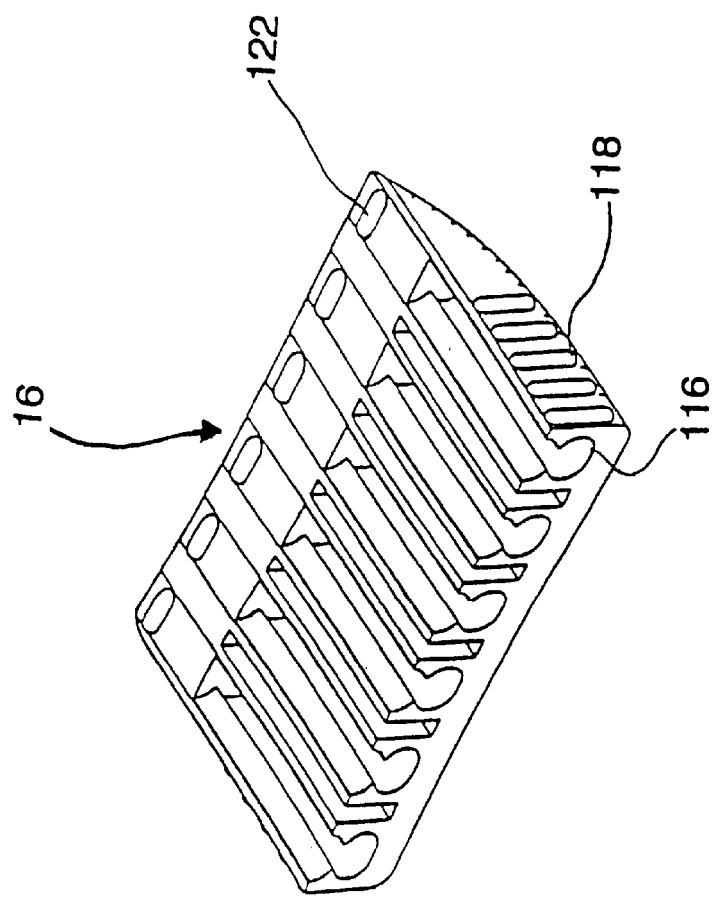
FIG. 11 is a interior side front perspective view of the color indicator label of the six circuit contact displacement assembly of FIG. 1.

FIG. 11 shows the interior side of a color indicator label element 16. Element 16 includes a rail receiving portion 116 for receiving ends of rails 60 of an interface end of CDA 10. Each rail 60 is from one single CDA assembly 18. The rail receiving portion 116 includes a narrow ridge such that element 16 slides on the various rails 60 of the various assemblies 18. Locking protuberances 122 cooperate with the locking groove 124 formed in overlay molded housing 58 of each interface end of each assembly 18 (see FIG. 7A). Another locking groove 136 is also provided in each rail 60 of each molded housing 58. Locking protuberance 122 allows the color indicator label element 16 to slide on the rails 60 of the assemblies 18 and be locked into position.

Figure 12:
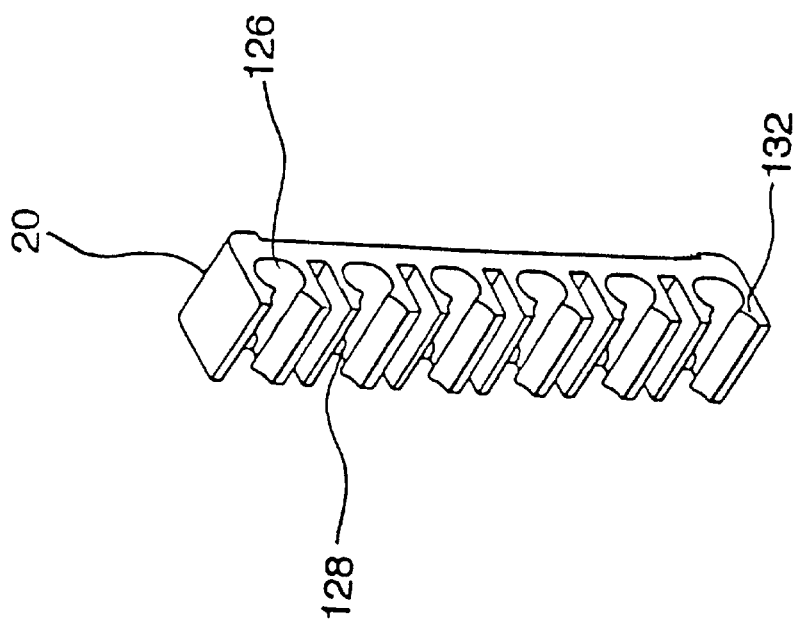
FIG. 12 is an interior side front perspective view of the circuit indication label support element of the six circuit contact displacement assembly of FIG. 1.

FIG. 12 shows a circuit indicator 20, which is connected to a plurality of assemblies 18 at one interface end, on a side opposite to an access side. The rails 60 on the access side are used for fixing the tap element 138 as described below. Circuit indicator 20 includes a rail receiving groove 126 with a base. The groove also defines a small dimension gap which allows the groove to be attached by sliding element 20 on to the rail 60 (or snapping it on). A protuberance 128 extends outwardly from the groove base and provides a locking element for extending into locking groove 136 of molded housing 58.

Figure 13A:
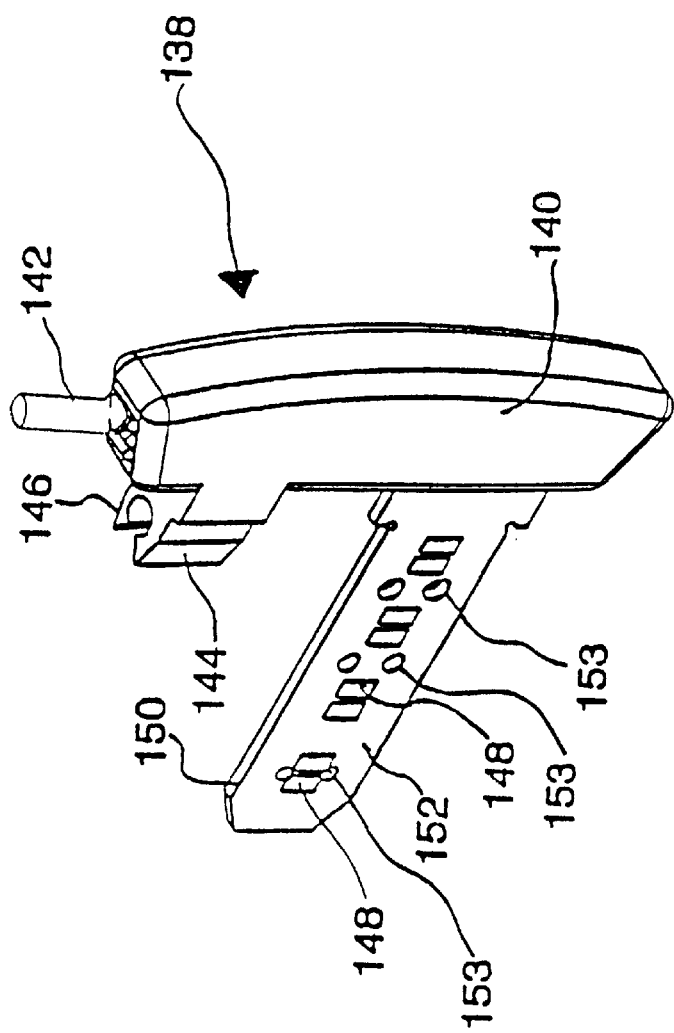
FIG. 13A is a left top perspective view of the tap according to the invention.
Figure 13B:
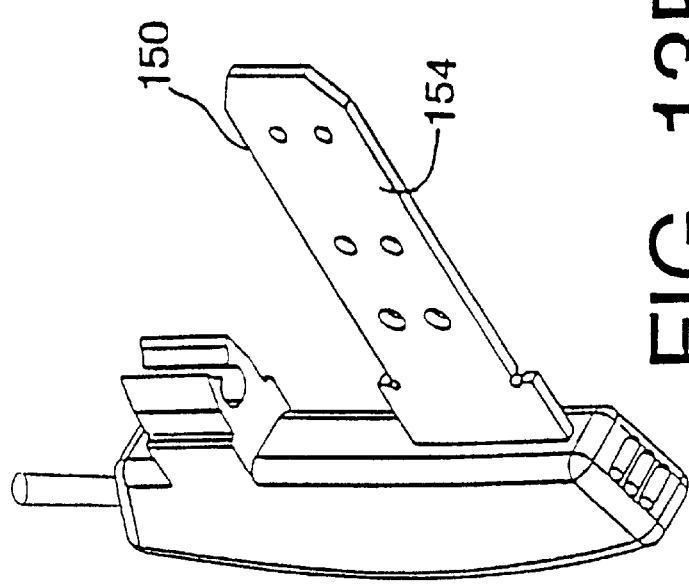
FIG. 13B is a right bottom perspective view of the tap according to the invention.

FIGS. 13A and 13B show views of a tap assembly 138. Several tap assemblies may be used with each mated interface. Each tap 138 is used to tap lines at an interface of contacts of single CDA assemblies 18 of mated interface ends of two CDA assemblies 10.

Each tap assembly 138 includes a body 140 with grasping region. A tap line 142 extends into the body wherein the various wires of tap cable 142 are connected to traces provided in or on a tap slot insertion element 150. The traces extend to contacts 148. A plurality of contacts 148 are provided on a contact side 152 of the tap slot insertion element 150. The tap body 140 is provided with a rail engagement portion 144. This defines a rail receiving groove 146 for rail 60. With this structure, the tap assembly 138 may be engaged with mated interface ends and fixed at exposed rail 60 on the tap side of one interface body such as interface body 8 (see FIG. 1).

Figure 5:
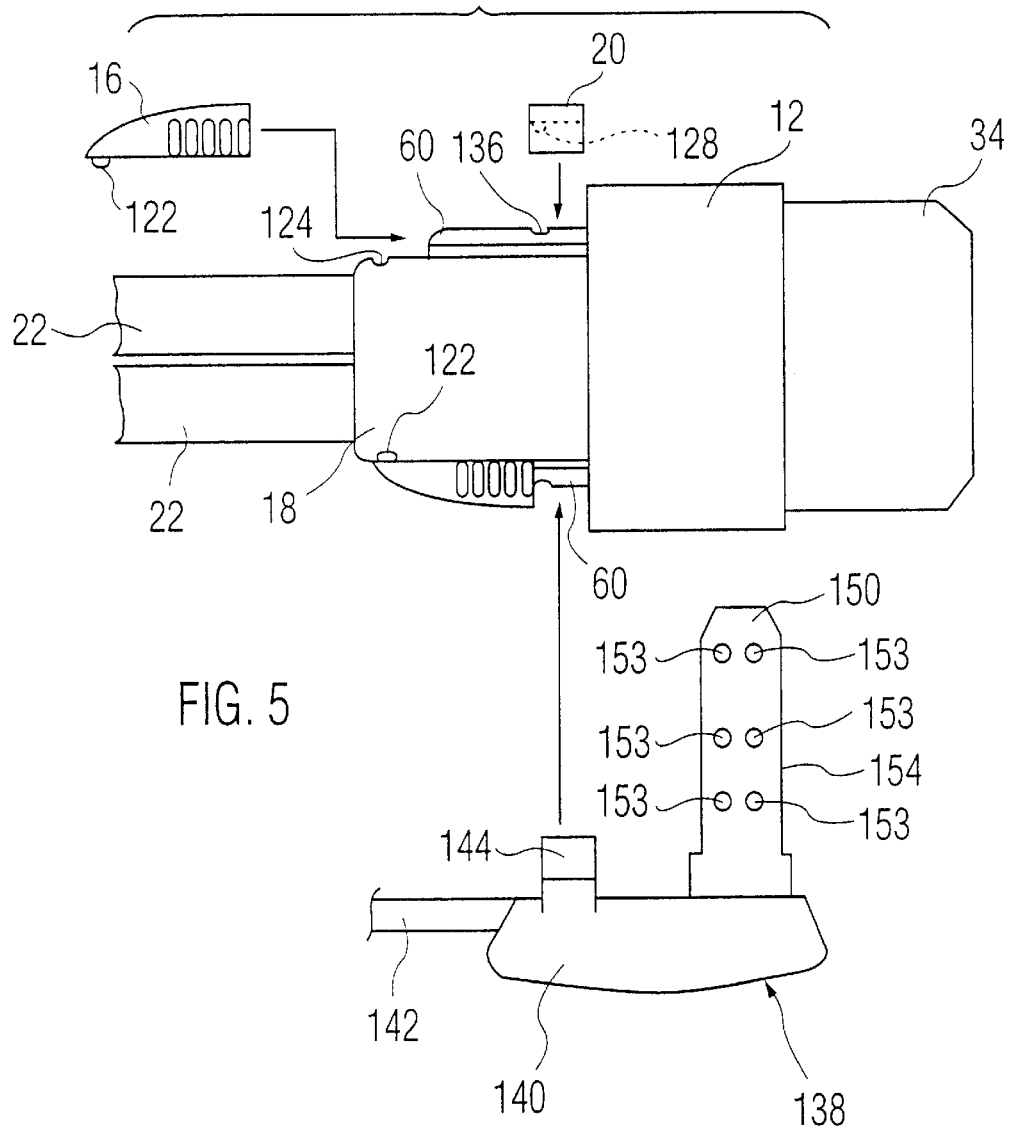
FIG. 5 is an exploded view of an interface end with the tap shown in a position for engagement.

As can be seen in FIG. 14, when interface ends are mated, the contacts are in an electrical contacts position with the contact portions 76 in physical contact for providing an electrical connection. As can be seen by comparing FIGS. 3A to FIGS. 3B, each tap slot insertion element 150 includes a contact side 152 and an opposite side 154. When the tap slot insertion element 150 is inserted into the insertion slot 56 (see FIG. 1 and FIG. 3A), the tap is positioned for connection of rail engagement portion 144 with the exposed rails 60 of the assemblies 18, the contacts 148 will connect with contacts 62 at the upstream side of the transmission line (see FIG. 5). The down stream side of the transmission line is broken as the contact 62 on the inner side of the interface (in the upstream interface element) is maintained out of contact with the tap due to the camming surfaces of tap cam follower 68 (protuberances 70, and the surface of tap opposite side 154). This state is shown in FIG. 15. A more detailed discussion of a similar contact displacement arrangement is discussed in U.S. patent application Ser. No. 08/651,414 (filed May 22, 1996), which is hereby incorporated by reference.

The protuberances or posts 70 in the contact opening device 66 are such that the contacts 62 are maintained in a non-contact position while the insertion element 150 is inserted between the contacts. When the tap 138 is properly positioned, the posts or protuberances 70 extend into openings 153. It is possible to only have openings 153 on the contact side 152 and to not have these on the opposite side 154. This will maintain one set of contacts 62 in a non-contact position. However, as no contacts 148 are provided on side 154, holes 153 can be provided on side 154 as well. This allows the contacts to move into a contact position although no electrical contact is made and the down stream line is disconnected.

The dimension of the tap slot insertion element 150 and the tap slots 56 defined by engaged parts of shields of mated interface element ends if preferably selected such that very few things can get between the mated interface ends to damage the contact displacement arrangement. The shape of the various portions 50, 54 and 52 of the shield 12 facilitates defining a small slot with no other access space on either the non-access side 30 or the access side 28.

Figure 13C:
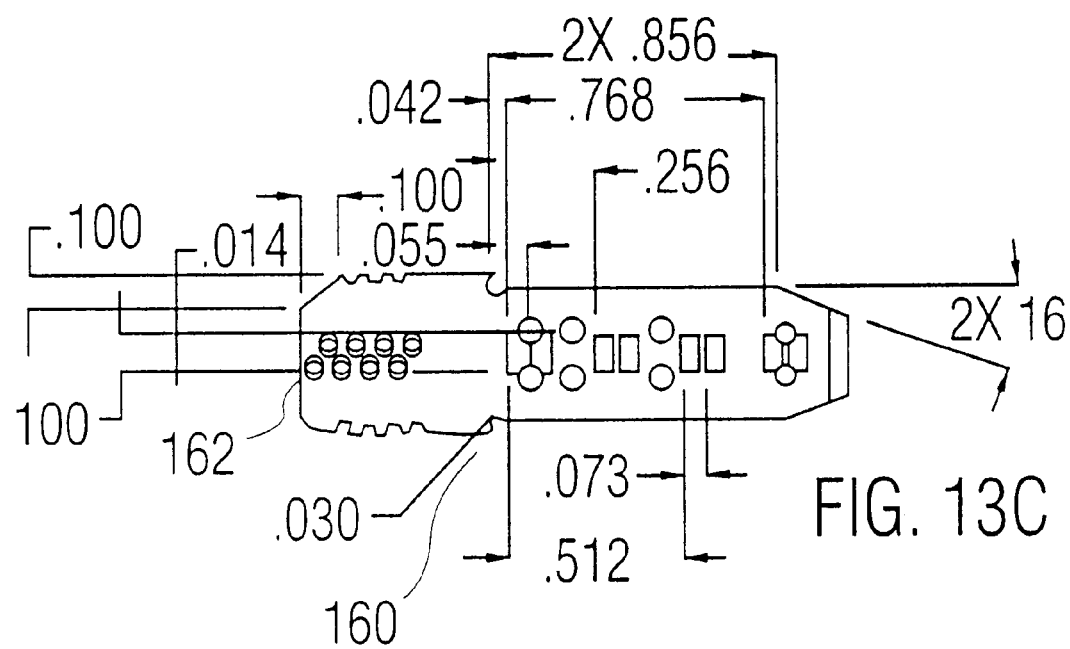
FIG. 13C is a front view of the main tap element, prior to the main tap element being connected with lines of a cable being joined with a tap molded portion.

FIG. 13C shows a front view of the main tap element 160 prior to overlaying or molding on the tap body 140. As can be seen, connection points 162 are provided for soldering on, welding or otherwise connecting lines of the tap cable 142. The tap element 160 is preferably made in the form of a printed circuit board (PCB). The PCB 160 has traces or other appropriate connection lines extending from contact points 162 to contacts 148.

The device is assembled by providing a cable at 22 as shown in FIG. 10a and placing twisted pair terminal ends 110 in the channels of the wire guide 64. As noted, the length of each terminal end 110 is the same. The wire guide is placed into contact with the contact alignment body 14 carrying contacts 62 and contact displacement device 66. Electrical contact between the terminal ends 110 and the contacts 62 is preferably provided by ultrasonic welding. Other known connections may be provided such as displacement contacts soldering or other joining for electrical contact. Ultrasonic welding is preferred as providing better characteristics including no significant additional resistance.

Figure 4:
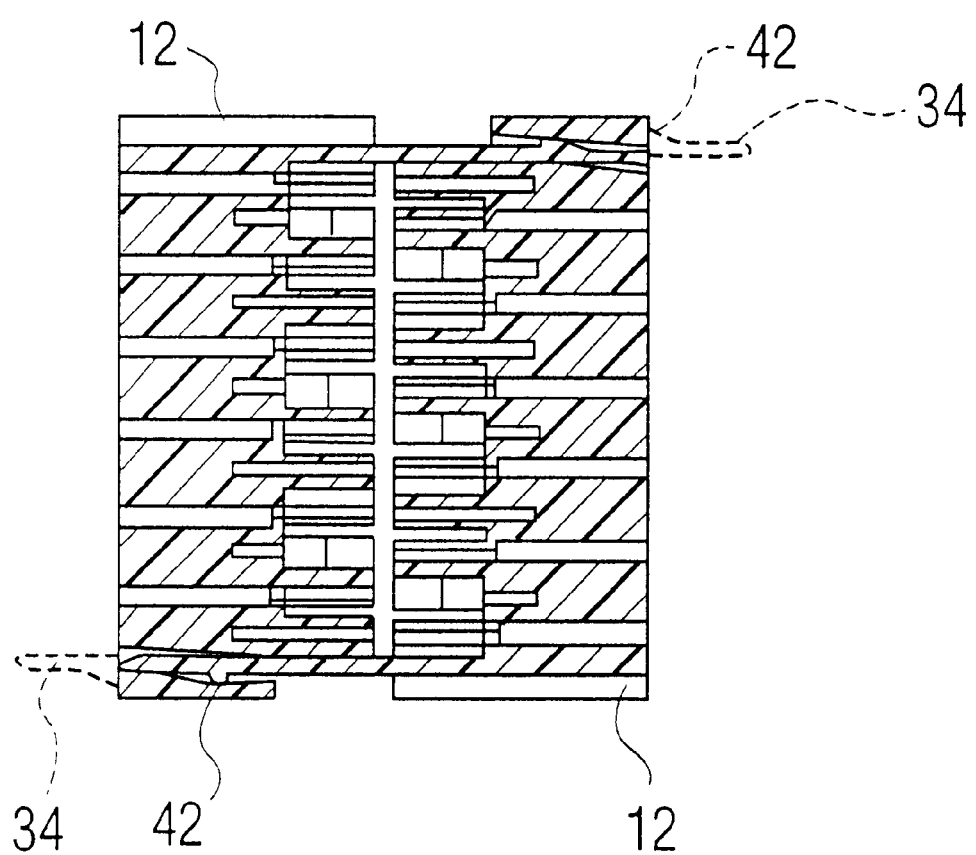
FIG. 4 is a cross sectional view of two shield elements in a position oriented for mating, with the tongue element shown in phantom in the locked mating position.

A structure as shown in FIG. 5B results from the above steps. Subsequently, this structure is overlay molded to provide overlay molded housing 58. When this is provided on both ends of the cable, this results in a single contact displacement assembly 18 as shown in FIG. 4. The single CDA 18 has two interface ends. One end of contact displacement assembly 18 is inserted in a shield 12. The other end is inserted in another shield 12. Engagement bezel 113, at the base of each contact alignment body 14, facilitates the insertion of an interface end of assembly 18. Engagement protuberance 114 has a back edge which provides a locking function upon engagement with locking groove 57 of shield 12 (see FIGS. 3B and 3C).

On the non-access side, by rails 60, a circuit indicator 20 may be connected via rails 60 and the connection between groove 124 and protuberance 134. In a similar manner, two color indicator labels can slide onto rails 60 on each side whereby locking protuberance 122 of each element 16 engages a respective locking groove 124 provided on rails 60. With these steps taken with regard to each interface element 8 and 6, an assembly 10 as shown in FIG. 1 is provided. The interface ends of the CDA 10 are identical and each interface element of the assembly 10 may mate with an identical interface element of another identical assembly 10.

Matting of interface ends takes place with the tongue 34 being inserted between the lower surface of the top 26 of shield 12 and the upper surface of male enclosure portion 38. Each male enclosure portion 38 extends into each female enclosure portion 40 with the various portions 52, 54 and 50 at the tap side engaging. When the engagement bezel 42 is positioned such that the back edge engages the back edge of shield top 26, the interface body of one assembly 10 is connected to the interface body of another assembly 10. In this position, the contacts 62 are in a contact position such that signals are transmitted downstream.

The tap 138 may be inserted on the tap side 28 of the shields of the mated interface ends. The tap may be fixed via rail 60 and engagement part 144. If the tap is inserted properly, engagement part 144 will connect with rail 60 in the inserted position. This will break the electrical contact between contacts 62 of two interfaces of two assemblies 10. This will provide a tapping contact via the tap contacts 148.

While specific embodiments of the invention have been shown and described in detail to illustrate the application of the principles of the invention, it will be understood that the invention may be embodied otherwise without departing from such principles.

What is claimed is:

1. A telecommunications/data link and connector interface assembly, comprising:
    a transmission cable comprising a plurality of transmission lines;
    an interface end assembly connected to said transmission cable and including:
        a contact alignment body including a line connection end and an interface end,
        a plurality of contact elements being positioned and aligned by said contact alignment body and extending from adjacent to said line connection end toward said interface end, each of said contact elements being movable between a contact position and a non-contact position, each of said contact elements including a contact area and a line connection area for an electrical connection with a line, and
        a housing, said contact alignment body being disposed in said housing in a locked position, said housing being substantially identical to a housing of another connector interface assembly and being matable therewith whereby contact elements carried by said contact alignment body are in a contact position and contact elements carried by a contact alignment body of said housing of another connector interface assembly are also in a contact position providing an electrical path through the connector to transmission lines of a downstream transmission cable; and
    a tap insertable between contact elements for tapping signals carried by said contact elements.

2. The assembly according to claim 1, further comprising:
    a contact opening device associated with said plurality of contact elements, said contact opening device including a tap engaging surface including camming/locking posts, said tap including a contact opening device engaging surface with post receiving openings, a tap transmission line and contact portions, said contact opening device engaging surface cooperating with said tap engaging surface camming/locking posts upon insertion of said tap to urge said contact elements into a non contact position and to move said contact element into a tapping position upon further insertion of said tap, said posts extending into corresponding said post receiving openings whereby said contact elements return to a contact position and said contact elements make electrical contact with said tap contact portions.

3. The assembly according to claim 2, wherein said contact elements carried by said contact alignment body of said housing of said another connector interface assembly are associated with another contact opening device including a tap engaging surface including camming/locking posts, said tap having a second contact opening device engaging surface without post receiving openings whereby at least some of said contact elements carried by said contact alignment body of said housing of said another connector interface assembly are urged into a non contact position upon insertion of said tap, said tap including tapping contacts on one side only, whereby said contact elements carried by said contact alignment body of said housing of said another connector interface assembly are disconnected while said tap is in said tapping position to interrupt at least one said electrical path through the connector interface assembly to transmission lines of a downstream transmission cable.

4. The assembly according to claim 1, wherein said housing of said connector interface assembly and said housing of said another connector interface assembly each include a plurality of male alignment tabs defining a space for receiving a contact alignment body and a plurality of female alignment tabs defining a space for receiving a contact alignment body, said male alignment tabs of one said housing being adapted for mating with said female alignment tabs of another said housing and said housing each including a locking means for locking said housings in a mated position.

5. The assembly according to claim 4, wherein said locking means includes a tongue and a tongue receiving portion, said tongue including a locking bezel for locking on back edge of said receiving portion.

6. The assembly according to claim 1, wherein said housing is an electromagnetic shield formed of plastic with embedded metallic elements.

7. The assembly according to claim 1, further comprising an additional contact alignment body with contact elements, wherein said housing is provided for receiving said additional contact alignment body, said housing defining an electromagnetic barrier for minimizing the effect of electromagnetic fields generated by contacts of said contact alignment body on contacts associated with said additional contact alignment body and for minimizing the effect of electromagnetic fields generated by contacts of said additional contact alignment body on contacts associated with said contact alignment body.

8. The assembly according to claim 1, further comprising:
a wire guide;
an overlay molded housing connected to said transmission cable, connected to said wire guide and connected to said contact alignment body to form a single contact displacement body interface end with guide rails on each of two sides;
an indicator label element adjacent to a first side of said housing; and
another indicator label element adjacent to another side of said housing, each indicator label element including receiving grooves for receiving a plurality of said support rails on one side to cooperate with a plurality of said single contact displacement body interface ends and said housing to form a connector block.

9. A telecommunications/data link and connector system, comprising:
a first transmission cable comprising a plurality of transmission lines;
a second transmission cable comprising a plurality of transmission lines;
a first interface assembly connected to said first transmission cable and including:
a first interface contact alignment body including a line connection end and an interface end, plurality of contact elements being positioned and aligned by said first interface contact alignment body and extending from adjacent to said line connection end toward said interface end, each of said first interface contact elements being movable between a contact position and a non-contact position, each of said first side contact elements including a contact area and a line connection area for an electrical connection with a line, and
a first interface housing, said first interface contact alignment body being disposed in said first interface housing in a locked position;
a second interface assembly connected to a second transmission cable and including:
a second interface contact alignment body including a line connection end and an interface end,
a second interface plurality of contact elements each of said second interface plurality of contact elements being positioned and aligned by said second interface contact alignment body and extending from adjacent to said line connection end toward said second interface contact alignment body interface end, each of said second side contact elements being movable between a contact position and a non-contact position, each of said second side contact elements including a contact area and a line connection area for an electrical connection with a line, and
a second interface housing, said second contact alignment body being disposed in said second interface housing in a locked position, each of said first interface housing and said second interface housing each include a plurality of male enclosures defining a space for receiving a contact alignment body, and including a plurality of female enclosures defining a space for receiving a contact alignment body, said male enclosures of one housing being adapted for mating with said female enclosures of another housing and said housings each including a locking means for locking to each other, wherein said locking means includes a tongue and a tongue receiving portion, said tongue including a locking bezel for locking on a back edge of a receiving portion of an identical housing.

10. The assembly according to claim 9, wherein said first housing and second housing are shields to electromagnetic interference and are each formed of plastic with embedded metallic elements.

11. The assembly according to claim 10, wherein said first interface plurality of contacts includes resilient means for supporting said contact area allowing said contact area to move between said contact position and said non-contact position.

12. The assembly according to claim 10, further comprising contact displacement means for moving contacts between said contact position and said non-contact position, and for allowing insertion of said tap between said first interface plurality of contacts and contacts of said substantially identical telecommunication/data link and connector assembly.

13. The assembly according to claim 12, wherein said contact displacement means includes a first contact opening device connected to said first interface plurality of contacts, said first contact opening device being engaged by said tap means, whereby said contact opening device moves contacts between said contact position and said non-contact position allowing insertion of said tap between said first interface plurality of contacts and contacts of said substantially identical telecommunication/data link and connector assembly.

14. The assembly according to claim 13, wherein said contact displacement means includes a second contact opening device connected to said second interface plurality of contacts, said second contact opening device moving said second interface plurality of contacts between said contact position and said non-contact position upon engagement with a tip of said tap means.

15. The assembly according to claim 9, wherein said first interface housing is provided for receiving additional contact alignment bodies with associated contacts and said second interface is provided for receiving additional contact alignment bodies, whereby additional contacts of mated interface housings can be moved from a contact position to a non-contact position.

16. An assembly according to claim 1, further comprising a wire guide, said transmission lines including twisted wire pairs with terminal ends, said wire guide having a wire entry side and a narrower width wire connection side, said wire guide defining wire paths of substantially equal distance from said wire entry side to said wire connection side, said wire guide being disposed between said transmission cable and said first contact alignment body.

17. The assembly according to claim 16, further comprising an overlay molded housing connected to said transmission cable, connected to said wire guide and connected to said first interface contact alignment body, said first interface contact alignment body including mold housing receiving sockets, said twisted pair terminal ends being electrically connected to said first interface plurality of contacts adjacent to said receiving sockets, a portion of said first interface contact alignment body, said wire guide and a portion of said cable being disposed in a mold and material being injected therein to contact and surround said portion of said cable, said wire guide and said portion of said first interface contact alignment body forming a single contact displacement body interface.

18. The assembly according to claim 17, wherein said single contact displacement assembly interface includes a support rail, said tap including a support rail engaging means for engaging said support rail when said tap is inserted between contact elements for tapping signals carried by said contact elements.

19. The assembly according to claim 9, wherein said first housing and second housing are shields to electromagnetic interference and are each formed of plastic with embedded metallic elements.

* * * * *